Patented Jan. 24, 1933

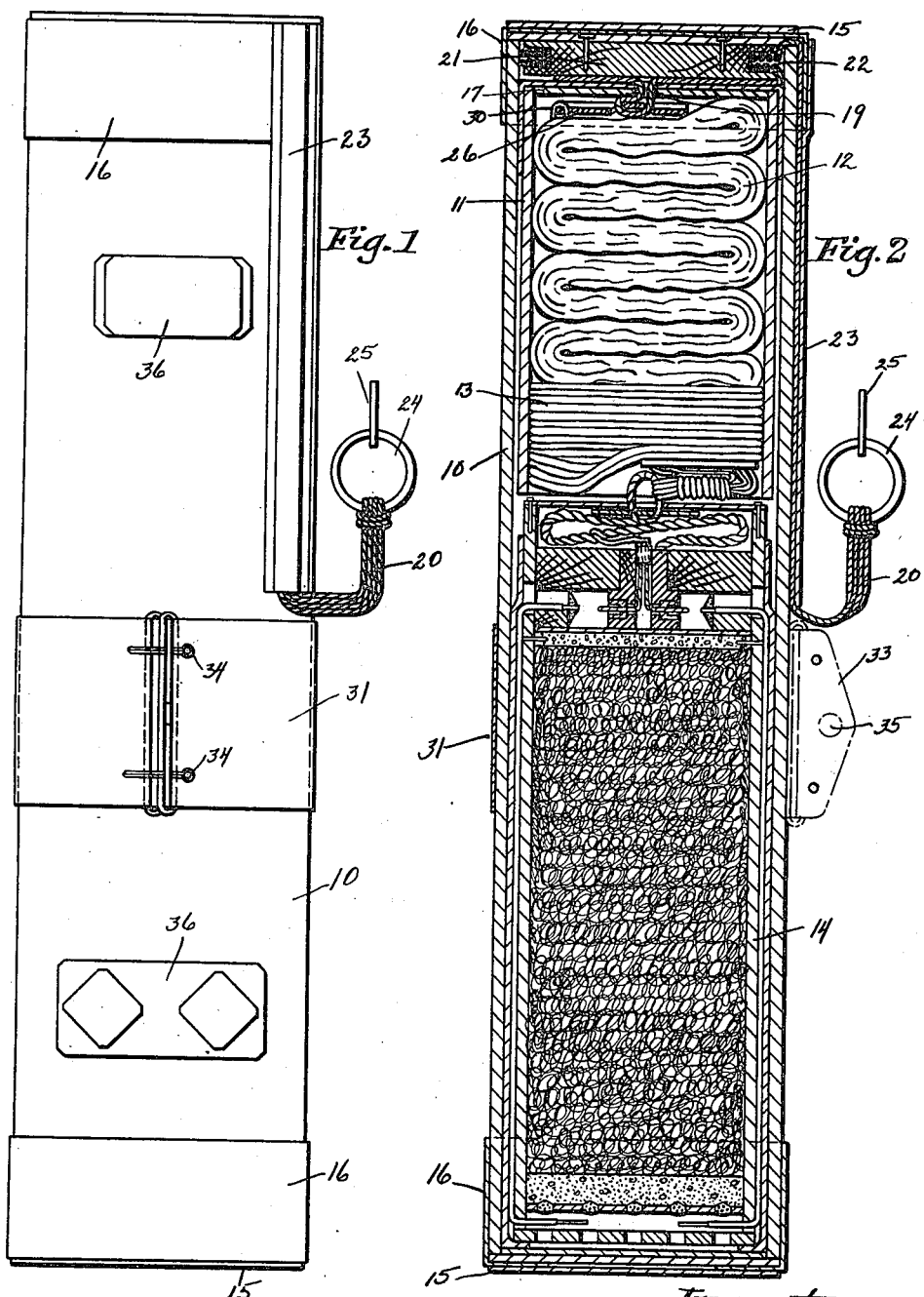

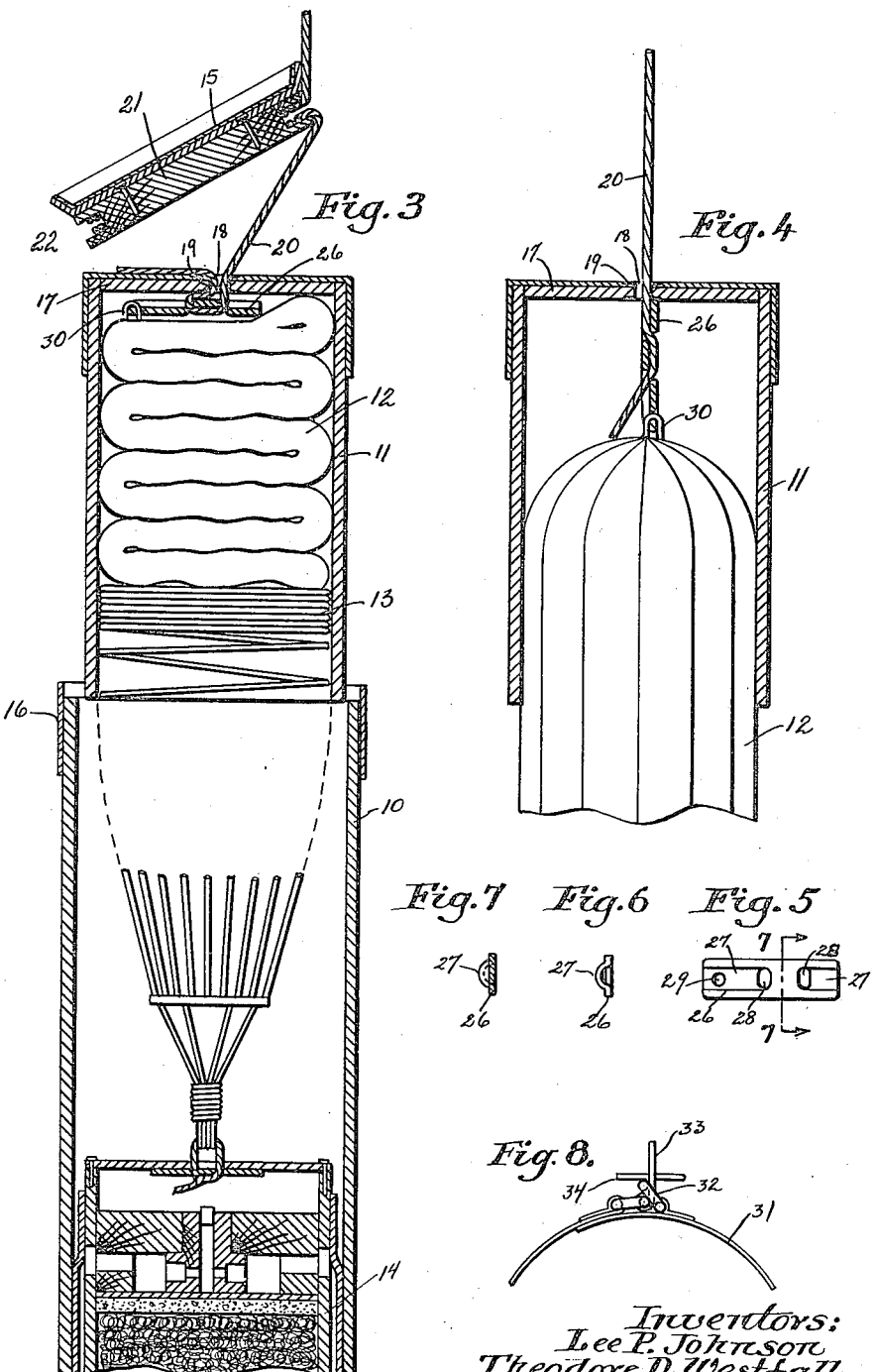

1,894,954

UNITED STATES PATENT OFFICE

LEE P. JOHNSON AND THEODORE D. WESTFALL, OF THE UNITED STATES NAVY, AND MAX W. FISCHER, OF WASHINGTON, DISTRICT OF COLUMBIA

AERIAL FLARE

Application filed April 15, 1932. Serial No. 605,456.

(GRANTED UNDER THE ACT OF MARCH 3, 1883, AS AMENDED APRIL 30, 1928; 370 O. G. 757)

The invention relates broadly to an aerial flare and more particularly to a releasing means for its air suspension device.

An object of this invention is to provide a flare that is suspended in air by a parachute, and means for releasing the parachute from its container.

Another object of the invention is to provide a flare that may be released from either a bomb rack or a cockpit of an aircraft.

With the above and other objects in view, the invention consists in the construction, combination and arrangement of parts as will be described more fully hereinafter.

Reference is to be had to the accompanying drawings forming a part of this specification, wherein like reference characters indicate corresponding parts throughout the several views, and in which:

Fig. 1 is a side elevation of an aircraft flare;

Fig. 2 is a longitudinal section of Fig. 1 showing the interior of the flare casing;

Fig. 3 is a longitudinal section through the parachute container showing the invention in its initial opening position;

Fig. 4 is a similar view showing the parachute about to be freed from its container;

Fig. 5 is a top view of the key that secures the parachute within its container;

Fig. 6 is an end view of Fig. 5;

Fig. 7 is a section on line 7—7 of Fig. 5;

Fig. 8 is an edge view, partly broken away, of the supporting band for the flare.

Referring more particularly to Fig. 2 of the drawings, 10 indicates the casing of the flare within which are mounted a parachute container 11 housing a parachute 12 and its shrouds 13, and an illuminant holder 14. The flare casing and parachute container are constructed of chipboard or strawboard, and the casing is closed at each end by discs 15 composed preferably of the same material as the casing. The discs are reinforced with cotton cloth 16 securely attached to the discs in any suitable manner, as well as to the outer periphery of the casing. One end of the parachute container 11 is closed likewise by a reinforced disc 17. The disc 17 is provided with a centrally located opening 18 that is reinforced by a metallic grommet 19, that permits the rip-cord 20 to pass through the disc without tearing it.

A guide spool 21 is located between the closed end of the parachute container and the end of the flare casing, and has a peripheral groove 22 sufficiently deep to accommodate at least two wrappings of the rip-cord. The function of the guide spool is to guide the rip-cord around the inside periphery of the flare casing to free the disc 15, as will be described later. The spool is attached to the disc 15 in any suitable manner so that it will not rotate when the rip-cord is being spun off the spool.

The rip-cord 20 is a flexible cord, tape or tube having sufficient strength to withstand the shock and pull when the parachute is withdrawn from its container upon release of the flare from an aircraft. It passes along the outer surface of the flare casing and is protected by a suitable cover 23, preferably a cloth strip glued or otherwise fastened to the casing. A ring 24, serving as a swivel, is secured to one end of the rip-cord, and a plate 25 forms a connection between the rip-cord and the arming pawl wire of a bomb rack of an aircraft. The plate is of suitable strength to retain the rip-cord to the aircraft upon release of the flare from the aircraft. The other end of the rip-cord passes through the grommet 19 and a key member 26, then again through the grommet, and is held between the closure 17 of the parachute container and the spool (Fig. 2).

The key member, shown in detail in Figs. 5 6 and 7, in a retangular piece of metal having a portion at each end depressed, as at 27, to form guideways for the rip-cord that passes through the holes 28, more clearly shown in Figs. 3 and 4. A small opening 29 at one end of the key member permits a loop 30 attached to the parachute to be passed therethrough attaching the parachute to the key member, for a purpose to be explained later. It will be noted in Figs. 2 and 3 that one of the holes 28 in the key member is offset from the reinforced opening 18 in the disc 17, so that, when the parachute is stowed in its container, a portion of the rip-cord is pressed between the raised portion of the key member and the closure disc for the container. This produces a binding action on the rip-cord by the key member firmly holding it against slipping until the parachute, when the flare has been released from an aircraft, has assumed the approximate position shown in Fig. 4 which places the key member in a position whereby the rip-cord may be easily pulled therethrough.

A flexible band 31 of suitable material supports the flare on a bomb rack of an aircraft. This band is provided with a hinged eye 32 at one end and a hinged tongue 33 on the other. The tongue is positioned through the eye, as shown more clearly in Fig. 8, and is held by cotter pins 34. An eye 35 in the tongue provides means whereby the band is attached to the bomb rack.

Suitable buffer plates 36 are mounted on the exterior of the flare casing to prevent chaffing of the fragile casing against other and harder objects, either in storage or when carried on an aircraft or other vehicle.

As already stated, the flare consists of any illuminant and parachute, wherein the ignition of the illuminant is effected by the suspension of the parachute. The shrouds 13 of the parachute are suitably connected to the illuminant holder so that when the parachute is unfolded, the illuminant holder will be suspended in air thereby.

The flare is suspended from the bomb rack of an aircraft by the eye in the tongue of the supporting band, and the metal plate 25 is attached to the arming pawl wire as above explained. Releasing the bomb rack mechanism in the accustomed manner for like devices, the flare falls free of the aircraft. The rip-cord, which is secured to the metal plate, is not separated from the aircraft when the flare is released, but remains with it, and therefore, as the flare falls, the rip-cord is pulled away from the casing through the covering 23. As before stated, the rip-cord has two or more wrappings around the guide spool. The weight of the flare in falling causes the rip-cord to unwind from the guide spool and cut through the cotton cloth reinforcement that binds the closure disc 15 to the casing severing the disc from the casing. When these parts are separated, the illuminant holder and flare casing drop away from the parachute holder, as shown in Fig. 3. In falling, they pull the parachute from its container, and when the slack in the rip-cord between the guide spool and key member is taken up, the drag of the parachute on the key member causes it to assume the position shown in Fig. 4. When in this position, the binding action on the rip-cord is released allowing it to slip from the key member, freeing the parachute so that it will slip out of its container to unfold and suspend the illuminant holder in air. The illuminant is automatically ignited by the pull on the quick matches, as is usual in devices of this character, and which forms no part of the present invention.

When the flare is released from a cockpit of an aircraft, the plate 25 is attached at some convenient point on the aircraft, and the flare thrown over the side.

It will be understood that the above description and accompanying drawings comprehend only the general and preferred embodiment of our invention, and that various changes in details of construction, proportion and arrangement of parts may be resorted to within the scope of the appended claims and without sacrificing any of the advantages of this invention.

The invention described herein may be manufactured and used by or for the Government of the United States for governmental purposes without the payment of any royalties thereon.

What we claim as new is:

1. An aerial flare including a body, a parachute container within the body, a parachute stowable within the container, an illuminant holder therein and adapted to be supported by the parachute when released, a flexible member disengageably connected with said container and adapted to sever the end of the flare body therefrom upon release of the latter from a carrying vehicle, and means for connecting the flexible member to the container.

2. An aerial flare including a body, a severable closure for the body, a flexible severing member within said body and extending to the exterior thereof, means within the body for guiding the flexible member around the interior periphery of the body, a parachute container and illuminant within the body, and a parachute within the container adapted to be unfolded upon severance of the body and the end thereof.

3. An aerial flare including a body, a severable closure for the body, a parachute container and an illuminant within the body, a parachute stowable within the container, a flexible severing member within the body and extending exteriorly thereof, and a guide spool between the body closure and parachute container for guiding the flexible member around the interior periphery of the body.

4. An aerial flare including a body, a parachute container and illuminant therein, a parachute stowable within the container, a flexible member for severing the end of the body therefrom, a guide spool for guiding said member in its severing motion, and means for disengageably connecting the flexible member to said container.

5. An aerial flare including a body, a severable closure for the body, a parachute container within the body, a parachute therein, a closure for the container, said second closure having a central opening therethrough, a flexible member for severing said first closure, means for guiding said flexible member in its severing motion, and means for producing a binding action on said member until the flare is released from a carrying member.

6. An aerial flare including a body, a severable closure for the body, a parachute container and an illuminant within the body, a parachute within the container, a closure for the container having a central opening, a flexible severing member, a guide spool about which the flexible member is wrapped, one end of the flexible member being secured to a carrying vehicle for the flare, a plate within the parachute container having a plurality of openings and indented portions, the flexible member passing through the closure opening and plate openings, one of the openings in the plate being off-set from the closure opening to produce a binding action on the flexible member until the flare is released from its carrying vehicle.

7. An aerial flare including a body, a severable closure for the body, a parachute container and an illuminant within the body, a parachute within the container, a flexible severing member, a guide spool for the flexible member, a plate within the parachute container for holding one end of the flexible member therein, and a connection between the parachute and plate for turning the plate to free the flexible member when the closure is severed from the body.

LEE P. JOHNSON.
THEODORE D. WESTFALL.
MAX W. FISCHER.